United States Patent
Shin et al.

(10) Patent No.: US 12,350,886 B2
(45) Date of Patent: Jul. 8, 2025

(54) 3D PRINTING SLICING METHOD FOR SOLVING QUANTIZATION ERROR PROBLEM

(71) Applicant: Korea Electronics Technology Institute, Seongnam-si (KR)

(72) Inventors: Hwa Seon Shin, Yongin-si (KR); Hye In Lee, Anyang-si (KR); Sung Hwan Chun, Seoul (KR); Sung Hun Park, Seoul (KR); Ji Min Jang, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 884 days.

(21) Appl. No.: 17/275,373

(22) PCT Filed: Feb. 19, 2020

(86) PCT No.: PCT/KR2020/002413
§ 371 (c)(1),
(2) Date: Mar. 11, 2021

(87) PCT Pub. No.: WO2020/218723
PCT Pub. Date: Oct. 29, 2020

(65) Prior Publication Data
US 2022/0055307 A1 Feb. 24, 2022

(30) Foreign Application Priority Data
Apr. 24, 2019 (KR) .................. 10-2019-0047673

(51) Int. Cl.
*B29C 64/40* (2017.01)
*B29C 64/386* (2017.01)
(Continued)

(52) U.S. Cl.
CPC ............ *B29C 64/386* (2017.08); *B29C 64/40* (2017.08); *B33Y 50/00* (2014.12);
(Continued)

(58) Field of Classification Search
None
See application file for complete search history.

(56) References Cited

U.S. PATENT DOCUMENTS

2004/0239009 A1* 12/2004 Collins .................. B29C 64/40
264/497
2008/0269939 A1* 10/2008 Kritchman ............. G01D 11/00
700/118
(Continued)

FOREIGN PATENT DOCUMENTS

JP 2017-113979 A 6/2017
JP 2017-165012 A 9/2017
(Continued)

OTHER PUBLICATIONS

Minetto et al. 'An optimal algorithm for 3D triangle mesh slicing' Computer-Aided Design 92 (2017) 1-10, Elsevier, published 2017.*
(Continued)

*Primary Examiner* — Bernard G Lindsay
(74) *Attorney, Agent, or Firm* — NSIP Law

(57) ABSTRACT

Provided is a 3D printing slicing method for solving a quantization error problem. A 3D model slicing method according to an embodiment of the present invention comprises: receiving, as input, data of a 3D model to be three-dimensionally printed; calculating the height of the input 3D model; revising the height of the 3D model on the basis of a result of the calculation; and slicing the 3D model having the revised height. Accordingly, the present invention can easily and reliably solve a slicing quantization error problem even without changing the lamination thickness of a 3D printer.

13 Claims, 5 Drawing Sheets

(51) Int. Cl.
*B33Y 50/00* (2015.01)
*G05B 19/4099* (2006.01)

(52) U.S. Cl.
CPC .............. *G05B 19/4099* (2013.01); *G05B 2219/35134* (2013.01); *G05B 2219/49023* (2013.01)

(56) References Cited

U.S. PATENT DOCUMENTS

| | | | |
|---|---|---|---|
| 2015/0290878 A1* | 10/2015 | Houben ................ | B29C 64/141 264/603 |
| 2017/0203515 A1 | 7/2017 | Bennett et al. | |
| 2019/0054700 A1* | 2/2019 | Chandar ................ | G06F 17/18 |
| 2019/0224909 A1* | 7/2019 | Riha ..................... | B29C 64/118 |
| 2020/0016826 A1* | 1/2020 | Edvinsson ............ | B29C 64/386 |
| 2021/0107231 A1* | 4/2021 | Yao ...................... | B29C 64/393 |

FOREIGN PATENT DOCUMENTS

| | | |
|---|---|---|
| KR | 10-1752126 B1 | 6/2017 |
| KR | 10-2019-0001153 | 1/2019 |
| KR | 10-2035454 B1 | 10/2019 |

OTHER PUBLICATIONS

Adnan et al. 'Real-time slicing algorithm for Stereolithography (STL) CAD model applied in additive manufacturing industry' IOP Conf. Series: Materials Science and Engineering 342 (2018), published 2018.*

* cited by examiner

3D PRINTING SLICING METHOD FOR SOLVING QUANTIZATION ERROR PROBLEM

CROSS REFERENCE TO RELATED APPLICATIONS

This application is a U.S. National Stage Application of International Application No. PCT/KR2020/002413, filed on Feb. 19, 2020, which claims the benefit under 35 USC 119(a) and 365(b) of Korean Patent Application No. 10-2019-0047673, filed on Apr. 24, 2019, in the Korean Intellectual Property Office, the entire disclosure of which is incorporated herein by reference for all purposes.

TECHNICAL FIELD

The present disclosure relates to three-dimensional (3D) printing technology, and more particularly, to a method and a system for solving a slicing quantization error problem which occurs in a 3D printing process.

BACKGROUND ART 3D printing is performed by slicing a 3D model into a plurality of layers and then stacking the sliced layers. In this case, if a height of the 3D model to be 3D printed is not an integer multiple of a layer thickness, a dimension error may occur.

This is called a slicing quantization error. For example, if a layer thickness is "2", a 3D model having a height of "7" may be 3D printed as having a height of "6" which is smaller than the 3D model as shown in FIG. 1. In another example, if a layer thickness is "4", the 3D model having the height of "7" may be 3D printed as having a height of "8" which is higher than the 3D model.

To solve this problem, a method of recognizing a height of a 3D model in advance in 3D printing and adjusting a layer thickness or adaptively slicing may be employed.

However, the method of recognizing the height of the 3D model in advance may have a problem that the height is not completely divided and low numbers of decimals remain, and thus may not be an ultimate solution to the quantization error.

In addition, the adaptive slicing method may require control of a 3D printer, and, if it is impossible or difficult to control the 3D printer, the adaptive slicing method may not be a solution to the quantization error problem.

DISCLOSURE

Technical Problem

The present disclosure has been developed in order to address the above-discussed deficiencies of the prior art, and an object of the present disclosure is to provide a method of adding a base support to make a height of a 3D model be an integer multiple of a layer thickness and then slicing, as a method for solving a slicing quantization error without changing a layer thickness of a 3D printer.

Technical Solution

According to an embodiment of the present disclosure to achieve the above-described object, a method for slicing a 3D model includes: receiving data of a 3D model to be 3D printed; calculating a height of the inputted 3D model; modifying the height of the 3D model based on a result of the calculating; and slicing the modified 3D model.

The modifying may include modifying the calculated height of the 3D model, based on a layer thickness in 3D printing.

The modifying may include modifying the height of the 3D model to be an integer multiple of the layer thickness.

The modifying may include modifying the height of the 3D model when the height of the 3D model is not an integer multiple of the layer thickness.

The modifying may include modifying the height of the 3D model by adding a base support to the 3D model.

The base support may be added to a lower portion of the 3D model.

A height of the base support may satisfy the following equation:

$$\text{Height of Base Support} = \text{Layer thickness} * n - \text{Height of 3D model}$$

where n is a minimum integer making the right hand side be a positive number.

According to an embodiment of the present disclosure, the 3D model slicing method may further include: 3D printing the 3D model by stacking sliced layers of the 3D model; and removing the base support from the 3D printed 3D model.

The removing may include removing the base support by referring to height information of the base support. However, this step is selectively performed according to a target to be outputted.

According to another embodiment of the present disclosure, a system for slicing a 3D model includes: a data provider configured to provide data of a 3D model to be 3D printed; and a processor configured to calculate a height of the provided 3D model, to modify the height of the 3D model based on a result of the calculating, and to slice the modified 3D model.

According to still another embodiment of the present disclosure, a method for slicing a 3D model includes: calculating a height of a 3D model; modifying the calculated height of the 3D model; and slicing the modified 3D model.

According to yet another embodiment of the present disclosure, a computer readable recording medium has a computer program recorded thereon to execute a method for slicing a 3D model, the method including: modifying a height of a 3D model; and slicing the modified 3D model.

Advantageous Effects

According to embodiments of the present disclosure as described above, a base support is added to make a height of a 3D model be an integer multiple of a layer thickness, and then slicing is performed, so that a slicing quantization error problem can be easily and reliably solved without changing a layer thickness of a 3D printer.

BEST MODE

Hereinafter, the present disclosure will be described in detail with reference to the accompanying drawings.

Embodiments of the present disclosure suggest a solution to a slicing quantization error problem which occurs in a process of slicing a 3D model inputted for layered manufacturing into layers.

To achieve this, embodiments of the present disclosure provide a method of adding a base support on a lower portion of a 3D model and modifying to make a height of the 3D model be an integer multiple of a layer thickness, and then slicing.

Figure 1:
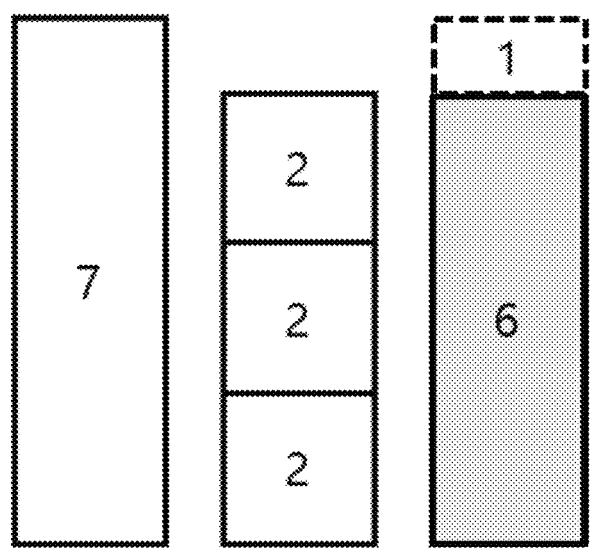
FIGS. 1 and 2 are views illustrating examples of a slicing quantization error.
Figure 2:
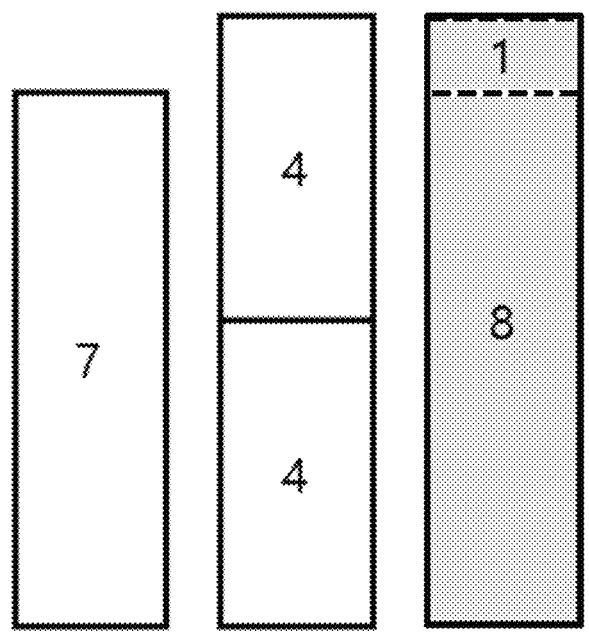
Figure 3:
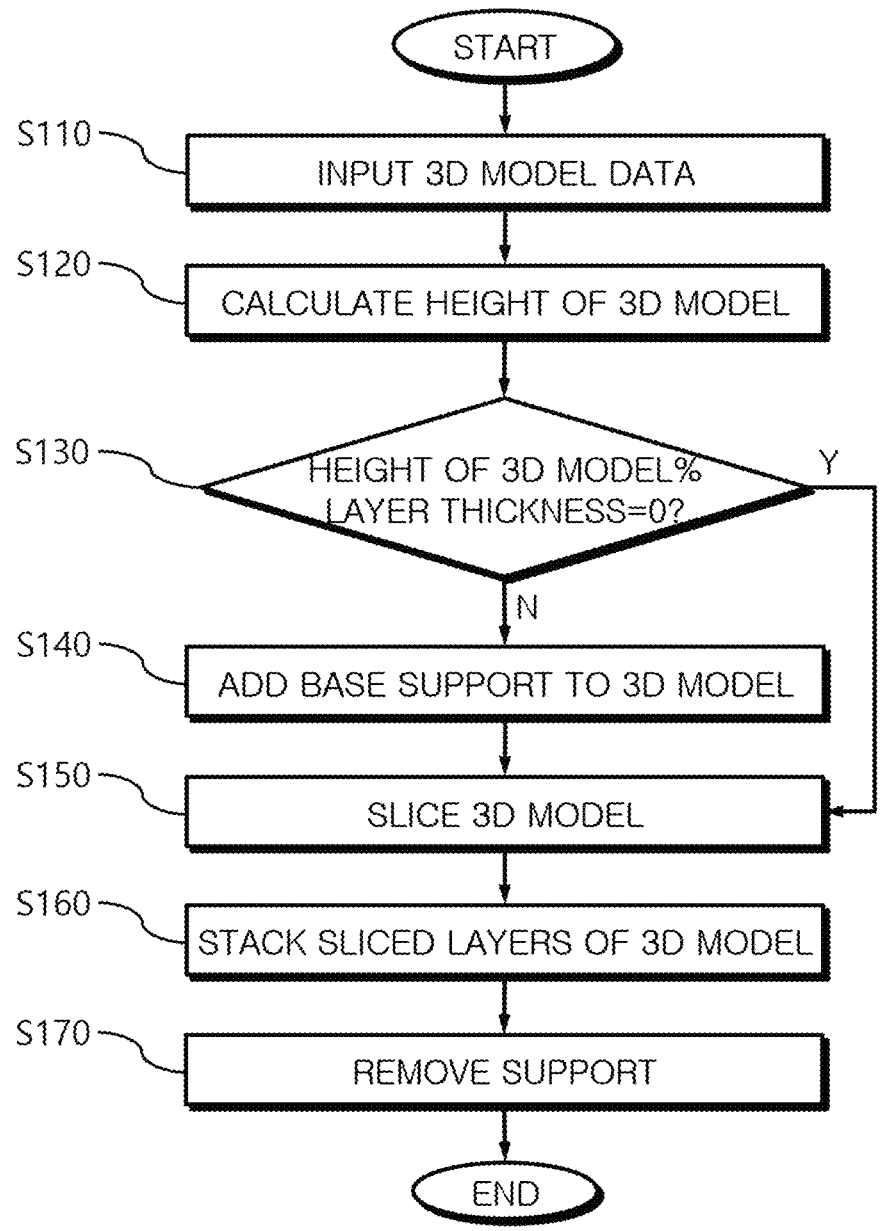
FIG. 3 is a flowchart provided to explain a 3D printing method according to an embodiment of the present disclosure.

FIG. 3 is a flowchart provided to explain a 3D printing method according to an embodiment of the present disclosure.

As shown in FIG. 3, when data of a 3D model to be 3D printed is inputted (S110), a height of the inputted 3D model (a length of the 3D model along a Z-axis) is calculated first (S120).

Next, it is identified whether the height of the 3D model calculated at step S120 is an integer multiple of a layer thickness of a 3D printer (S130). Step S130 is based on a method of identifying whether the height of the 3D model is completely divided by the layer thickness, that is, whether the remainder after dividing is zero.

When it is identified that the height of the 3D model is an integer multiple of the layer thickness (S130—Y), step S140 is not performed and step S150 is performed.

On the other hand, when it is identified that the height of the 3D model is not an integer multiple of the layer thickness (S130—N), a base support is added to the 3D model (S140).

Adding the base support at step S140 is to modify the height of the 3D model. Specifically, the base support is added to make the height of the 3D model be an integer multiple of the layer thickness.

The base support is added to a lower portion of the 3D model, and a height of the base support HB is determined to be a value satisfying the following equation:

Height of Base Support (*HB*)=Layer thickness\**n*−Height of 3D model (*HM*)

where n is a minimum integer making the right hand side be a positive number.

In general, it is advantageous to make the height of the 3D model as low as possible in 3D printing in order to reduce consumption of a material and an output time. Accordingly, n is preferably a minimum integer.

At step S140, the height of the 3D model is modified to an integer multiple of the layer thickness of the 3D printer. This is because the base support is added by a height which is the size by which the height of the 3D model is less than an integer multiple of the layer thickness.

In either the case where step S140 is performed to add the base support to the 3D model or the case where it is identified that the height of the 3D model is an integer multiple of the layer thickness and step S140 is not performed, a process of slicing the 3D model is performed afterward (S150).

Thereafter, the 3D model is 3D printed by stacking layers generated by slicing the 3D model at step S150 (S160). Next, the base support is removed from the 3D model 3D printed at step S160 (S170).

The base support removed at step S170 is the base support that is added to the 3D model at step S140. To remove the base support, height information of the created base support is referenced through step S170.

At step S170, other supports may be removed along with the base support.

However, the base support may not be selectively removed according to a situation when post-processing is not required.

Figure 4:
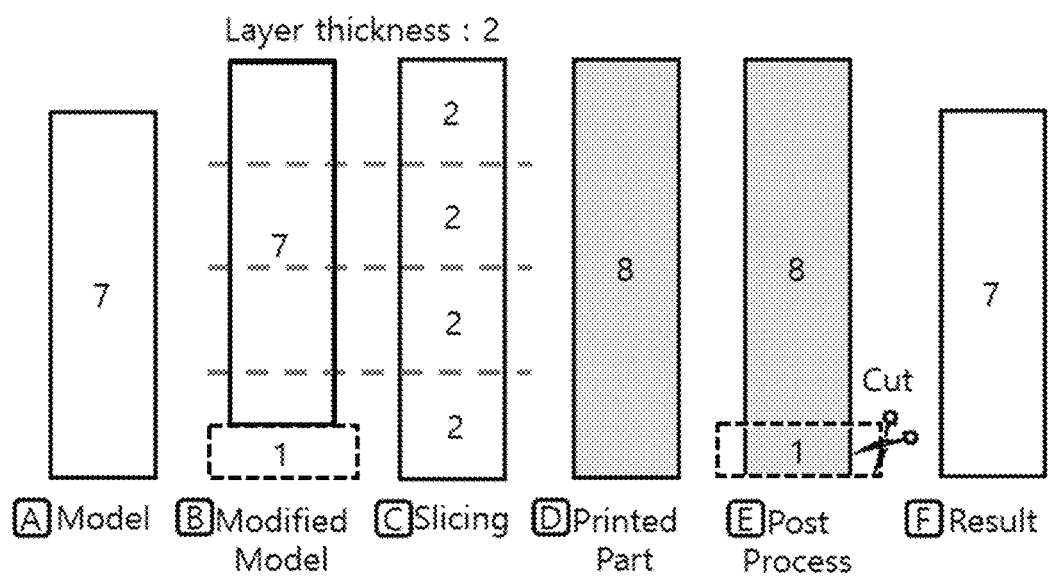
FIG. 4 is a view schematically illustrating a 3D printing process shown in FIG. 3.

The 3D printing method for solving the slicing quantization error problem which has been described up to now will be additionally described with reference to FIG. 4. FIG. 4 is a view schematically illustrating the 3D printing process shown in FIG. 3.

Step [A] of FIG. 4 illustrates 3D model data to be 3D printed. As shown in the drawing, the height of the 3D model is "7".

Step [B] of FIG. 4 illustrates that a layer thickness of a 3D printer is set to "2", and a base support having a height of "1" is created under the 3D model to modify the height of the 3D model to an integer multiple of "2" that is larger than "7" since the height of the 3D model is "7".

Since a minimum value of the integer multiples of "2" that are larger than "7" is "8", the height of the base support is determined to be "1" (=2\*4−7).

Step [C] of FIG. 4 illustrates a process of slicing the 3D model to which the base support is added by the layer thickness "2". Since the height of the 3D model is the integer multiple of the thickness layer, the 3D model is segmented without a remaining area in the slicing process.

Step [D] of FIG. 4 illustrates a result of 3D printing by stacking the sliced layers of the 3D model, and step [E] of FIG. 4 illustrates a process of cutting out the base support added at step [B] as a post-processing step. However, this step may be selectively performed according to a target to be outputted.

Final step [F] of FIG. 4 illustrates the final 3D printing output, and shows that the final output has the same height as the 3D model appearing at step [A] of FIG. 4, and a dimension error which may be caused by a quantization error does not occur.

Figure 5:
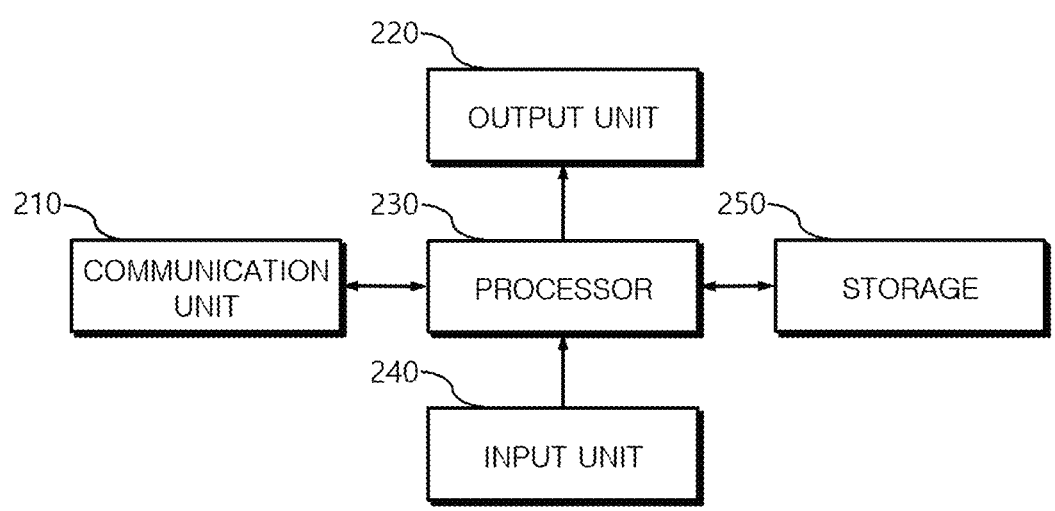
FIG. 5 is a block diagram of a 3D model slicing system according to another embodiment of the present disclosure.

FIG. 5 is a block diagram of a 3D model slicing system according to another embodiment of the present disclosure. The 3D model slicing system according to an embodiment of the present disclosure may be implemented by a computing system including a communication unit 210, an output unit 220, a processor 230, an input unit 240, and a storage 250 as shown in FIG. 5.

The communication unit 210 connects communication with a 3D printer to transmit data necessary for 3D printing. The input unit 240 is a means for receiving setting/command necessary for 3D model slicing/printing, and the output unit 220 is a display for displaying a screen related to 3D model slicing/printing.

The processor 230 slices a 3D model according to the process suggested in FIG. 3, and transmits sliced 3D model data to the 3D printer and performs 3D printing.

The storage 250 provides a storage space necessary for the processor 230 to perform the corresponding processes. 3D model data may be provided to the processor 230 through the communication unit 210 and the storage 250.

Up to now, the 3D printing slicing method and system for solving the quantization error problem have been described in detail with reference to preferred embodiments.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical concept or prospect of the present disclosure.

The invention claimed is:

1. A processor-implemented method for slicing a 3D model, the method comprising:
    inputting data of a 3D model, to be 3D printed, into a 3D printer hardware;
    calculating a height of the inputted 3D model and determining whether the height of the 3D model is an integer multiple of a pre-defined layer thickness;
    removing a slicing quantization error without changing a layer thickness of the 3D printer hardware before actually performing a 3D printing of the 3D model, including in response that the height of the 3D model is determined to be not the integer multiple of the pre-defined layer thickness, modifying the height of the 3D model based on a result of the calculating and the determining and adding a base support to the modified 3D model;
    slicing the modified 3D model into plural layers; and
    performing, using the 3D printer hardware, a 3D printing of the modified 3D model using a result of the slicing by stacking sliced layers of the 3D model, and removing the base support from the 3D printed 3D model by referring to height information of the base support.

2. The method of claim 1, wherein the modifying comprises modifying the calculated height of the 3D model, based on the pre-defined layer thickness in 3D printing.

3. The method of claim 2, wherein the modifying comprises modifying the height of the 3D model to be the integer multiple of the layer thickness.

4. The method of claim 1, wherein the base support is added to a lower portion of the 3D model.

5. The method of claim 1, wherein a height of the base support satisfies the following equation:

$$\text{Height of Base Support} = \text{Layer thickness} * n - \text{Height of 3D model}$$

where n is a minimum integer making the right hand side be a positive number.

6. A system for slicing a 3D model, the system comprising:
    a processor configured to:
    provide data of a 3D model, to be 3D printed, to a 3D printer hardware as an input;
    calculate a height of the provided 3D model, including determining whether the height of the 3D model is an integer multiple of a pre-defined layer thickness;
    remove a slicing quantization error without changing a layer thickness of the 3D printer hardware before actually performing a 3D printing of the 3D model, including in response that the height of the 3D model is determined to be not an integer multiple of a pre-defined layer thickness, modifying the height of the 3D model based on a result of the calculating and the determining and adding a base support to the modified 3D model;
    slice the modified 3D model into plural layers; and
    perform, using the 3D printer hardware, a 3D printing of the modified 3D model using a result of the slicing by stacking sliced layers of the 3D model, and removing the base support from the 3D printed 3D model by referring to height information of the base support.

7. The system of claim 6, wherein, for the modifying, the processor is configured to modify the calculated height of the 3D model, based on the pre-defined layer thickness in 3D printing.

8. The system of claim 7, wherein, for the modifying, the processor is configured to modify the height of the 3D model to be the integer multiple of the layer thickness.

9. The system of claim 6, wherein the base support is added to a lower portion of the 3D model.

10. The system of claim 6, wherein a height of the base support satisfies the following equation:

$$\text{Height of Base Support} = \text{Layer thickness} * n - \text{Height of 3D model}$$

where n is a minimum integer making the right hand side be a positive number.

11. The system of claim 6, wherein, for the removing, the processor is further configured to remove the base support by referring to height information of the base support.

12. A processor-implemented method for slicing a 3D model, the method comprising:
    calculating a height of a 3D model and determining whether the height of an inputted 3D model is an integer multiple of a pre-defined layer thickness;
    removing a slicing quantization error without changing a layer thickness of a 3D printer hardware before actually performing a 3D printing of the 3D model, including in response that the height of the 3D model is determined to be not an integer multiple of a pre-defined layer thickness, modifying the calculated height of the 3D model and adding a base support to the modified 3D model;
    slicing the modified 3D model into plural layers; and
    performing, using the 3D printer hardware, a 3D printing of the modified 3D model using a result of the slicing by stacking sliced layers of the 3D model, and removing the base support from the 3D printed 3D model by referring to height information of the base support.

13. A non-transitory computer readable recording medium storing instructions that, when executed by a processor, configure the processor to perform a method for slicing a 3D model, the method comprising:
    calculating a height of a 3D model and determining whether the height of an inputted 3D model is an integer multiple of a pre-defined layer thickness;
    removing a slicing quantization error without changing a layer thickness of a 3D printer hardware before actually performing a 3D printing of the 3D model, including in response that the height of the 3D model is determined to be not an integer multiple of a pre-defined layer thickness, modifying a height of a 3D model and adding a base support to the modified 3D model;
    slicing the modified 3D model into plural layers; and performing, using the 3D printer hardware, a 3D printing of the modified 3D model using a result of the slicing by stacking sliced layers of the 3D model, and removing the base support from the 3D printed 3D model by referring to height information of the base support.

* * * * *